3,733,380
PRODUCTION PROCESS FOR A CORE
BODY OF SKI
Yoshikatsu Ishida, Hamamatsu, Japan, assignor to Nippon
 Gakki Seizo Kabushiki Kaisha, Hamamatsu-shi, Shizu-
 oka-ken, Japan
Filed Mar. 10, 1971, Ser. No. 122,727
Claims priority, application Japan, Mar. 18, 1970,
45/22,480; Dec. 30, 1970, 46/123,007
Int. Cl. B29d 27/00
U.S. Cl. 264—45    12 Claims

ABSTRACT OF THE DISCLOSURE

A process for producing a core body of ski comprising the steps of preparing a combined mold consisting of an upper mold and a lower mold and forming a molding cavity therebetween in such a manner that the vertical measurement of the cavity conforms to the thickness distribution of the desired core body of ski, disposing the combined mold obliquely so that an end thereof is located at a lowermost position, providing an opening in one part of the upper mold extending from the center to the upper end of the obliquely disposed mold, pouring a hard type foamable resin into the molding cavity, closing the opening, foaming and solidifying the resin thus poured inside of the molding cavity, and taking out the core body thus formed inside of the molding cavity.

BACKGROUND OF THE INVENTION

This invention relates generally to production of the ski, and more particularly to methods for producing ski bodies wherein a hard type foamable resin is employed as a core material thereof.

Recently, a hard type foamable resin such as polyurethane resin is attracting public attention in expectation of providing a good substitute for the conventional wood core material for the ski body. The reason of this resides in that acquiring of good wood core material is becoming even more difficult and that the conventional procedures of laminating wood core material and shaping wood core material thus laminated into desired configuration have required considerable amount of labor and by no means adapted to the mass-production. In contrast with the conventional wood core material, the hard type foamable resin can be easily obtained in the market and can be formed into desired configurations by molding procedure which is well adapted to the mass-production of the ski bodies.

However, the molding procedure of the foamed core body of the ski, although it is thus adapted to the mass-production of the ski bodies, has yet required a high quality material and selection of optimum conditions for foaming the material in the filling of the molding cavity with the foamable material and obtaining a uniform distribution of the foamed resin throughout the narrowed ends of the ski body because the configuration of the core body is such that the thickness thereof is gradually decreased from the comparatively thick central portion toward the end portions along its length and that the length of the core body is of a considerable value. Moreover, if it is desired to elevate the operation efficiency of the metal mold employed for this purpose and to improve the mass-productivity of the core body, the foamable resin material must be of a type having a quick reaction speed and superior workability for shortening the molding cycle, and the molding cavity must be filled with such a material uniformly and quickly so that a sufficient amount of the material is supplied to the thinned end portions of the core body.

SUMMARY OF THE INVENTION

A principal object of this invention is to provide an improved method for producing the core body of the ski whereby the foamable resin material can be quickly and sufficiently supplied into the narrowed end portions of the comparatively long molding cavity of the ski core.

Another object of the present invention is to provide an improved method for producing the core body of the ski whereby the molding operation can be achieved efficiently.

Still another object of the present invention is to provide an improved method for producing the core body of the ski whereby the molding cycles of the metal mold can be made faster and the mass-productivity of the core body is much improved.

A further object of the present invention is to provide an improved method for producing the core body of the ski wherein, as another aspect of the invention, the foamable resin material is poured inside of a molding cavity formed by the upper and lower plates constituting a part of the ski body.

A method for producing the core body of the ski according to one aspect of the present invention comprising the steps of preparing a combined metal mold having an upper mold and a lower mold, the upper and lower molds forming a molding cavity conforming to the thickness distribution of the desired core body of the ski, disposing the combined mold obliquely so that an end of the mold occupies a lowermost position, opening at least one part of the upper mold in a portion ranging from the center to the upper end of the obliquely disposed combined mold, filling the molding cavity with a hard type foamable resin in liquid state, closing the part of the upper mold, foaming the material thus poured inside of the molding cavity, and releasing the combined mold so that the molded core body of a desired shape can be thereby obtained.

In another aspect of the invention, a method for producing the core body of the ski may comprise the steps of providing a ski upper member and a ski lower member joined together at the up-turning portion only of the forward ski body, disposing these two members in a spaced apart relationship by employing spacers or metal molds on both sides thereof so that a gap conforming to the thickness distribution of the core body is maintained between these members, filling inside of a cavity formed by the upper and lower members and the spacers or metal molds with a hard type foamable resin in the liquid state, foaming and solidifying the resin in the cavity, and removing the spacers or metal molds so that a desired core body is thereby obtained.

The principle, nature, and utility of the present invention will be better understood from the following detailed description of the invention when read in conjunction with the accompanying drawings.

DETAILED DESCRIPTION OF THE INVENTION

Figure 1:
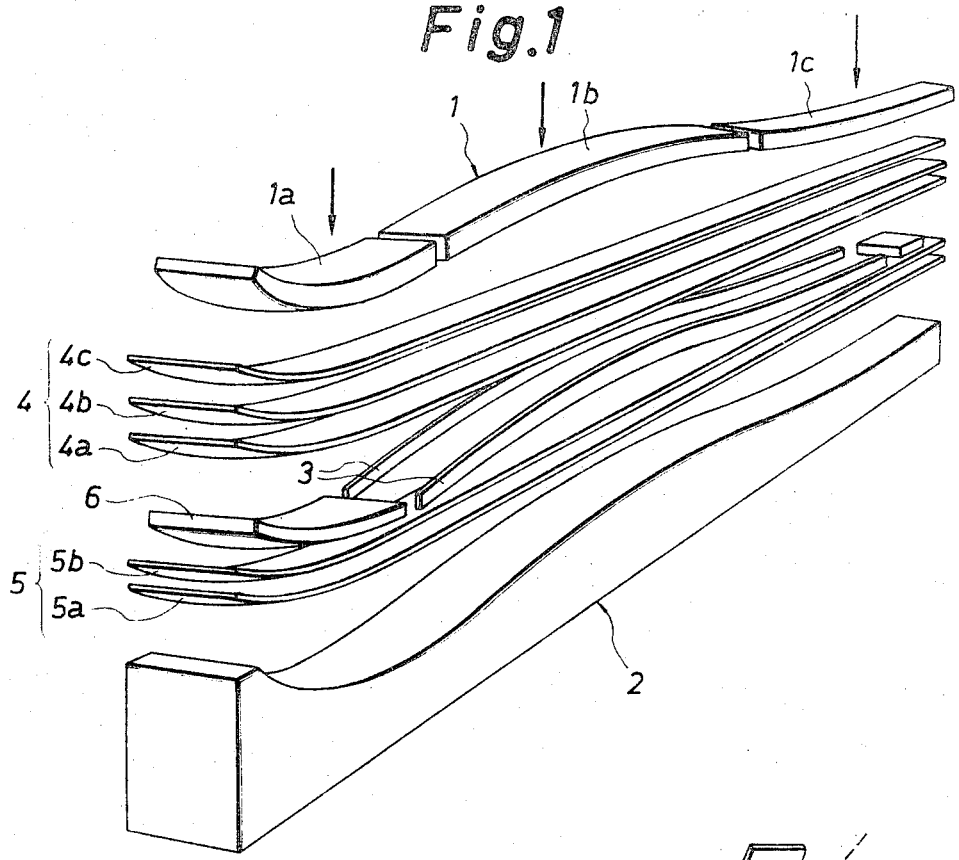
FIG. 1 is an exploded perspective view of a molding arrangement for the core body of a ski, which is used to indicate a production process according to the present invention.

Referring now to FIG. 1, there is indicated a molding arrangement of the core body of a ski wherein an upper mold 1 and a lower mold 2 are disposed in a confronting relation with spacers 3, 3 interposed therebetween. The spacers 3, 3 are formed in such a manner that the vertical measurements correspond to the thickness distribution along the length of the ski core body, and also that they may act as lateral side plates, defining a gap between the upper mold 1 and the lower mold 2.

In an example shown in FIG. 1, upper reinforcing members 4 and lower reinforcing member 5 consisting of glass fiber reinforced plastic (FRP) plates, rubber sheets, metal plates, wood plates, or the like are suitably interposed between the upper mold 1 and the lower mold 2 and the spacers 3, 3 may be interposed between the upper reinforcing members 4 and the lower reinforcing member 5 or may be disposed laterally outwardly of these members 4, 5 directly interposed between the upper mold 1 and the lower mold 2.

The upper surface of the lower mold 2 is formed into a curve, as shown in FIG. 1, to conform with the curved surface or canver of the ski body, and the lower surface of the upper mold 1 is also conforming to the shape of the ski body. The upper mold 1 is in addition divided into three pieces 1a, 1b, and 1c for the purpose of effectively clamping it to the lower mold 2 while a filling port can be readily formed adjacent to one end of the molding assembly. Closely adjacent to the forward ends of the spacers 3, 3 at a portion corresponding to the forward up-turning end of the ski, there is provided a separate core member 6 made of a rigid material such as wood, plastic, or metal, inserted between the upper reinforcing members and the lower reinforcing members, which, in this example, are respectively made of a fiber reinforced plastic (FRP) plate 4a, a rubber sheet 4b, a metal plate 4c and an FRP plate 5a, a wood plate 5b.

Figure 2:
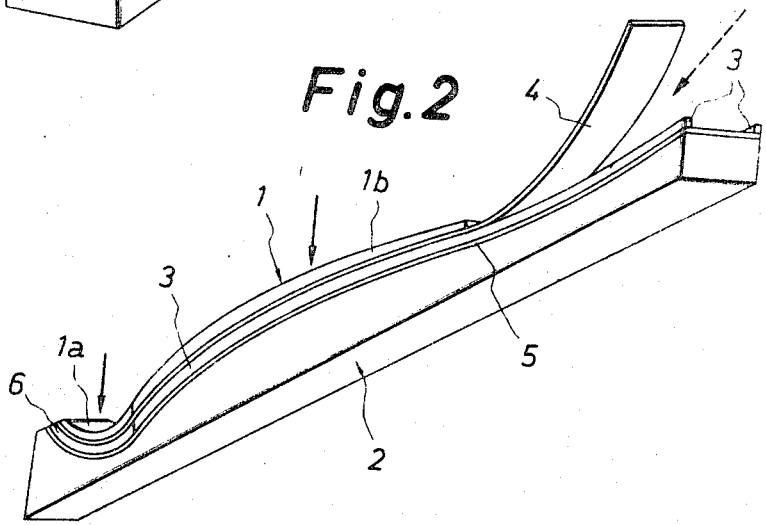
FIG. 2 is a perspective view indicating the molding arrangement which is tilted so that a foamable resin can be poured thereto.
Figure 3:
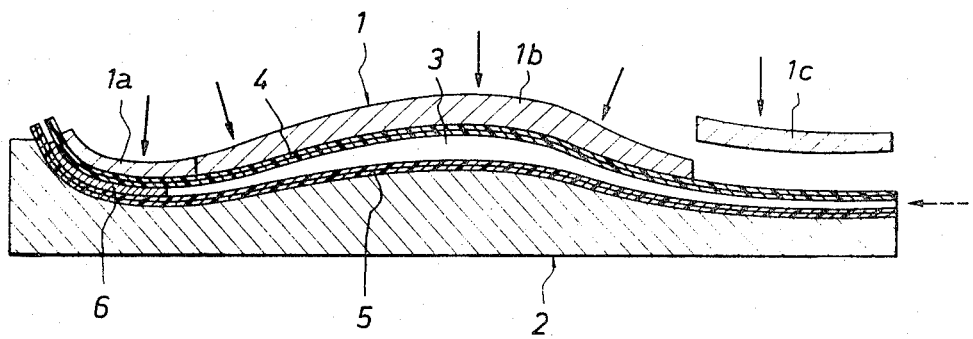
FIG. 3 is a longitudinal sectional view showing the state of the molding arrangement at the time the molds are being clamped and the foamable resin filling inside.

When it is desired to mold the core body within the above described molding arrangement, the lower reinforcing members 5, which are bonded together with an adhesive agent or a pre-preg sheet are at first placed on the upper surface of the lower mold 2, and the forward core member 6 is bonded on the reinforcing members 5, and then the spacers 3, 3 are placed on the upper surface of the lower reinforcing members 5 at both sides thereof so that the spacers 3, 3 rise up from the upper surface of the lower reinforcing members 5. Then the upper reinforcing members 4 are extended on both of the forward core member 6 and the spacers 3, 3, being bonded only to the forward core member 6, and pieces 1a and 1b of the upper mold 1 are placed on the corresponding positions over the upper reinforcing members 4. The reinforcing members 4 are also bonded together with an adhesive agent or pre-preg sheets. The upper mold 1a, 1b and the lower mold 2 are then clamped together, and the thus obtained molding assembly is thereafter disposed obliquely at an inclination of about 30° to 40° with the forward end placed downwardly. Rear end portion of the upper reinforcing members 4 are then pushed upwardly as shown in FIG. 2, and the polyurethane resin is poured through an opening thus formed into the inside cavity formed between the upper and lower reinforcing members 4, 5 and the spacers 3, 3. The rear end portions of the upper reinforcing members 4 are then replaced back to the original positions, and another piece 1c of the upper mold 1 is placed on its corresponding position as shown in FIG. 3.

Figure 4:
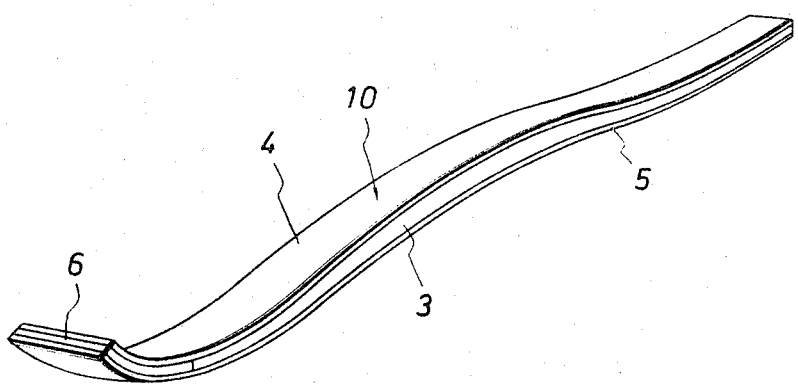
FIG. 4 is a perspective view showing a core body of a ski thus produced.

The molding assembly thus closed is again clamped strongly and is subjected to a suitable treatment for foaming and solidifying of the polyurethane resin. After solidifying of the polyurethane resin, the upper and lower molds 1 and 2 are removed, and a formed core body of ski having upper and lower reinforcing members and the spacers integrally bonded with the polyurethane foamed core is obtained. The core body is then trimmed on both side portions including the spacers, so that a desired distribution of width is attained for the core body of the ski. Such a core body is denoted by a numeral 10 in FIG. 4.

The above described core body is thereafter laminated with a decorative plate and a sliding surface or sole plate on the upper reinforcing member and the lower reinforcing member, respectively, and fitted with running edges, top protector, tail protector, and the like to be completed into a ski. Since a metal plate is employed, in the above example, for an outermost reinforcing plate 4c, attachment of the top edges may be omitted.

As will be apparent from the above description, the production process according to the embodiment of the invention allows to provide an opening of a sufficient size to supply the foamable resin material throughout the inside cavity of the molding assembly, whereby the occurence of defective products because of the insufficient flow of the material can be prevented, and the molding of the core body can be carried out efficiently.

Figure 5:
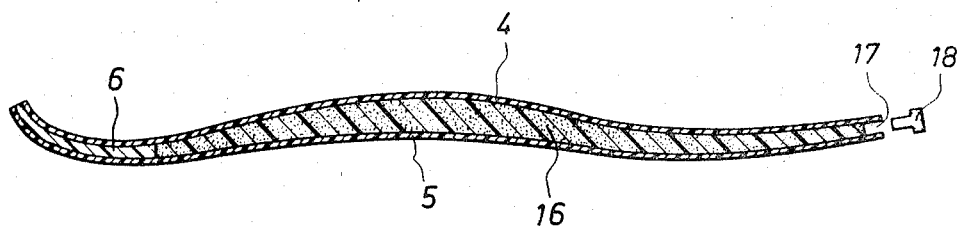
FIG. 5 is a longitudinal sectional view of a ski produced in accordance with another aspect of the present invention.
Figure 6:
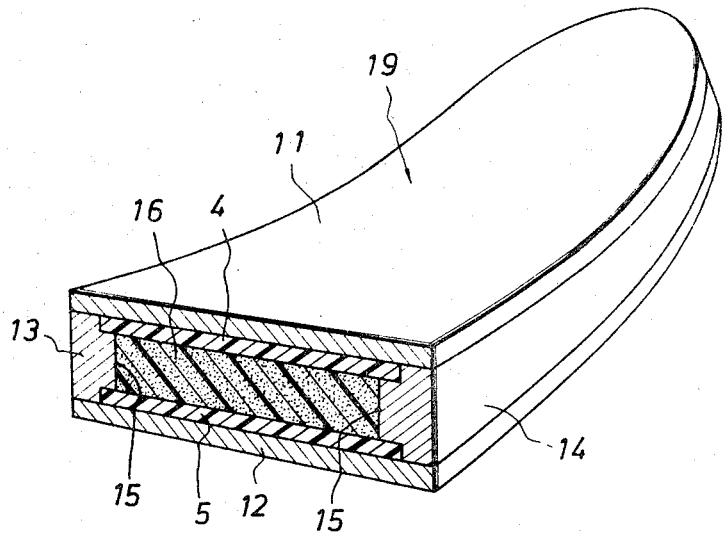
FIG. 6 is a perspective view partly in section of another molding arrangement employed for the production of the ski body shown in FIG. 5.

FIGS. 5 and 6 indicate a ski body produced in accordance with another embodiment of the present invention which can be divided into a preliminary process and a principal process. The preliminary process includes steps of providing an upper surface or upper reinforcing member and a lower surface or lower reinforcing member. The upper surface member may for instance consist of an ABS resin surface plate, an aluminum alloy reinforcing plate and a fiber reinforced plastic plate, and the lower surface member may consist of a sliding surface plate, an aluminum alloy plate and/or fiber reinforced plastic plate. The upper and lower surface members are laminated separately and shaped to conform with the required configuration for a ski.

The preliminary process further includes steps of inserting a forward core member and a spacer between the upper surface member and the lower surface member juxtaposed in an up-and-down relationship. The spacer of this embodiment may be a plate-like member having a suitable thickness distribution and width conforming to those of the surface members. The forward core member may be made of ABS resin and inserted between the two members at a position forward from the forward grounding point of the ski. All of the members thus assembled are bonded together in the same manner as in the above first embodiment by using a mold as is shown in FIG. 1. This embodiment differs from the abovementioned embodiment in that the upper and lower surface members and forward core member thus assembled together are taken out of the first mold shown in FIG. 1, the spacer then being removed from the assembly, and that the assembly is thereafter shifted to another mold as will be explained below, so as to be combined with a foamed core. The preliminary process is completed when the spacer is removed from the bonded assembly.

In the principal process, as is shown in FIGS. 5 and 6, the upper and lower surface members 4 and 5 bonded together with the forward core member 6 interposed therebetween are placed into a metal mold 19 consisting of upper and lower mold members 11 and 12 and side mold members 13 and 14, each of the side mold members having a stepped projection 15 on the inside wall thereof. The upper and lower surface members 4 and 5 are spaced apart from each other by the stepped projectioins 15 and 15 interposed therebetween along the side edges of the surface members 4 and 5, and a molding cavity is thus defined by the upper and lower surface members 4 and 5 and the side mold members 13 and 14. The mold 19 is covered with the upper mold member 11 and is firmly clamped. Thereafter, a hard type foamable polyurethane resin 16 is poured into the molding cavity from an opening 17 formed at the rear end of the mold assembly. After the completion of the filling step, the opening 17 is closed by means of a rear protector 18, and the whole assembly is subjected to a heating treatment so that the foamable resin is foamed and solidified. The foamed core firmly bonded to the upper and lower surface members is taken out of the second mold, and the side edges of the surface members 4 and 5 are trimmed off in the same way as in the first embodiment of this invention.

With the above described processes, it will be apparent that a core body of a ski has been molded integral with the upper surface member and the lower surface member of the laminated ski body, and the assembling of the ski body can be further economized.

What is claimed is:

1. A process for producing a core body of a ski comprising the steps of providing a ski upper member and a ski lower member each having an up-turning portion at a first end thereof, said upper and lower members being bonded together at said first end, said bonding of the ski upper member and ski lower member being carried out through a core member interposed between said upper and lower members at said first end portions of each of said upper and lower members; separating the rest of said two members by metal molds so that a cavity conforming to the thickness distribution of the core body is maintained therebetween and an open mouth is provided at one end, pouring a polyurethane foamable resin into the cavity through the open mouth at said one end formed by the upper and lower members and said metal molds, foaming and solidifying the resin and bonding the resin to the upper and lower members within the molding cavity, and taking out the core body from the metal molds.

2. A process for producing a core body of a ski comprising:
preparing a mold having a curvature substantially conforming to that of the ski;
placing a first plate member having an end portion in said mold;
placing a second plate member having an end portion spaced above the first plate member by a pair of spacers, said first end portions of said first and second plate members being adjacent to each other;
bonding the first end portions of said first and second plate members together, said bonding of the first and second plate members being carried out through a core member interposed between said plate members at said end portions of each of said plate members, said plate members and spacers thereby defining a cavity having an open mouth formed at the ends of the plate members away from the bonded end portions;
clamping the first and second plate members having said spacers therebetween tightly to the mold so that said cavity assumes a shape in response to the curvature of the mold;
pouring a polyurethane foamable resin into the cavity through said open mouth;
closing said open mouth;
foaming and solidifying the resin and bonding said first and second plate members to said resin to form a core body; and
thereafter removing the core body thus formed from the mold.

3. A process as claimed in claim 2 wherein said pair of spacers are extended, respectively, along the side edges of the first plate member.

4. A process as claimed in claim 2 wherein at least one of said first and second plate members comprises a plurality of laminated sheets bonded together.

5. A process as claimed in claim 2 wherein said foamable resin is poured into the cavity with said mold disposed obliquely so that the end of the mold at which said open mouth exists is held higher than the other end thereof.

6. A process as claimed in 5 wherein said mold disposed obliquely is held at an inclination of about 30° to 40°.

7. A process for producing a core body of a ski comprising:
preparing a first and a second mold;
placing a first plate member having a first end portion on the first mold;
placing a second plate member having a first end portion spaced above said first plate member by spacing means interposed between said first and second plate members;
bonding the first end portions of the first and second plate members together, said bonding of the first and second plate members being carried out through a core member interposed between said end portions of each of said plate members;
removing said spacing means from between the first and second plate members;
spacing those portions of the first and second plate members other than the bonded one end portions thereof by inserting said second mold in between the first and second plate members along both side edges of the first and second plate members extending in the lengthwise directions thereof, said first and second plate members and second mold defining a cavity with an open mouth formed at the other ends of the plate members;
clamping the first and second plate members tightly to said second mold;
pouring a polyurethane foamable resin into said cavity through said open mouth;
closing said open mouth;
foaming and solidifying said resin, and bonding said resin to said first and second plate members; and
thereafter removing the second mold from between the first and second plate members.

8. A process as claimed in claim 7 wherein at least one of said first and second plate members comprises a plurality of laminated sheets bonded together.

9. A process as claimed in claim 7 wherein said bonding of the first and second plate members is carried out through a core member interposed between said end portions of each of said plate members.

10. A process as claimed in claim 7 wherein said foamable resin is poured into the cavity with said second mold disposed obliquely so that the end of the second mold at which said open mouth exists is held higher in position than the other end thereof.

11. A process as claimed in claim 7 wherein said second mold disposed obliquely is held at an inclination of about 30° to 40°.

12. A process as claimed in claim 7 wherein said mold comprises a pair of side mold members each having a stepped projection, said first and second plate members being spaced apart from each other by inserting the stepped projections of said side mold members in between said first and second plate members.

References Cited

UNITED STATES PATENTS

| | | | |
|---|---|---|---|
| 3,503,621 | 3/1970 | Schmidt | 280—11.13 L |
| 3,446,692 | 5/1969 | Turnbull | 264—45 X |
| 3,498,626 | 3/1970 | Sullivan | 280—11.13 L |
| 3,276,784 | 10/1966 | Anderson | 280—11.13 L |
| 3,208,761 | 9/1965 | Sullivan | 280—11.13 L |
| 3,161,911 | 12/1964 | Mathews | 264—45 X |
| 3,435,470 | 4/1969 | Krenzler | 264—45 X |

FOREIGN PATENTS 1,273,422   9/1961   France _____ 280—11.13 L

OTHER REFERENCES

Knox, R. E., Stengard, R. A., "Molding Rigid Urethane Foam" Urethane Foam Made with Dupont Hylene, Oct. 28, 1960, pp. 1–12.

DONALD J. ARNOLD, Primary Examiner

U.S. Cl. X.R

264—51; 280—11.13 L